(12) United States Patent
Badar et al.

(10) Patent No.: US 12,418,824 B2
(45) Date of Patent: Sep. 16, 2025

(54) BEST EFFORT SERVICE USING A NON-GUARANTEED BIT RATE (NON-GBR) BEARER

(71) Applicant: T-Mobile USA, Inc., Bellevue, WA (US)

(72) Inventors: Saqib Badar, Bellevue, WA (US); Boris Antsev, Bothell, WA (US); Shujaur Mufti, Snoqualmie, WA (US); Nassereddine Sabeur, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 102 days.

(21) Appl. No.: 17/591,522

(22) Filed: Feb. 2, 2022

(65) Prior Publication Data

US 2023/0247475 A1 Aug. 3, 2023

(51) Int. Cl.
*H04W 28/02* (2009.01)
*H04L 65/1016* (2022.01)
*H04M 15/00* (2024.01)

(52) U.S. Cl.
CPC ..... *H04W 28/0268* (2013.01); *H04L 65/1016* (2013.01); *H04M 15/66* (2013.01)

(58) Field of Classification Search
CPC .......... H04W 28/0268; H04L 65/1016; H04M 15/66
See application file for complete search history.

(56) References Cited

U.S. PATENT DOCUMENTS

| 2016/0212668 | A1* | 7/2016 | Castro Castro | H04L 47/80 |
| 2020/0053135 | A1* | 2/2020 | Liang | H04L 12/1407 |
| 2022/0386164 | A1* | 12/2022 | Lee | H04W 28/0273 |
| 2023/0007557 | A1* | 1/2023 | Zhu | H04W 36/00226 |
| 2023/0139372 | A1* | 5/2023 | Sinha | H04L 65/1045 370/259 |
| 2023/0283645 | A1* | 9/2023 | Atarius | H04L 69/165 370/328 |

* cited by examiner

*Primary Examiner* — Syed Ali
*Assistant Examiner* — Najeeb Ansari
(74) *Attorney, Agent, or Firm* — Foley IP Law, PLLC (57) ABSTRACT

Solutions for providing best effort service for voice calls (including video calls) using a non-guaranteed bit rate (GBR) bearer include: receiving, at a proxy node (e.g., a proxy-call session control function (P-CSCF)), a request to set up a voice session for a UE; requesting, by the proxy node, a policy node (e.g., a policy and charging rules function (PCRF) or a policy control function (PCF)) to set up a GBR data pipe (e.g., a dedicated bearer, a quality of service (QoS) class identifier (QCI) 1 bearer, or a fifth generation (5G) QoS identifier (5QI) 1 bearer); based at least on an error condition (e.g., a timeout or error message), instructing, by the proxy node, the UE to set up the voice session using an existing non-GBR data pipe (e.g., a default bearer, a QCI-5 bearer, or a 5QI-5 bearer).

20 Claims, 6 Drawing Sheets

BEST EFFORT SERVICE USING A NON-GUARANTEED BIT RATE (NON-GBR) BEARER

BACKGROUND

When a cellular device, such as a user equipment (UE), connects to a cellular network, such as a fourth generation (4G) or fifth generation (5G) cellular network, two data pipes are typically set up. One is a data default bearer and one is an internet protocol (IP) multimedia system (IMS) default bearer. The IMS default bearer is used for session initiation protocol (SIP) signaling, which is used for setting up voice calls.

When the UE attempts to place a voice call, such as a voice over long-term evolution (VoLTE) call in 4G, a voice over new radio (VoNR) call in 5G, or a video call, SIP signaling over the IMS default bearer in the control plane is used to set up an IMS dedicated bearer for a call data pipe. If a new IMS dedicated bearer cannot be set up in time (e.g., 10 to 15 seconds) when a UE is attempting to place a new voice call, the call will be unsuccessful. If a new IMS dedicated bearer cannot be set up in time during a handover, the call will be dropped. Both scenarios degrade user experience.

SUMMARY

The following summary is provided to illustrate examples disclosed herein, but is not meant to limit all examples to any particular configuration or sequence of operations.

Solutions for providing best effort service for voice calls (including video calls) using a non-guaranteed bit rate (GBR) bearer include: receiving, at a proxy node (e.g., a proxy-call session control function (P-CSCF)), a request to set up a voice session for a UE; requesting, by the proxy node, a policy node (e.g., a policy and charging rules function (PCRF) or a policy control function (PCF)) to set up a GBR data pipe (e.g., a dedicated bearer, a quality of service (QoS) class identifier (QCI) 1 bearer, or a fifth generation (5G) QoS identifier (5QI) 1 bearer); based at least on an error condition (e.g., a timeout or error message), instructing, by the proxy node, the UE to set up the voice session using an existing non-GBR data pipe (e.g., a default bearer, a QCI-5 bearer, or a 5QI-5 bearer).

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for providing best effort service for voice calls (including video calls) using a non-guaranteed bit rate (GBR) bearer include: receiving, at a proxy node (e.g., a proxy-call session control function (P-CSCF)), a request to set up a voice session for a UE; requesting, by the proxy node, a policy node (e.g., a policy and charging rules function (PCRF) or a policy control function (PCF)) to set up a GBR data pipe (e.g., a dedicated bearer, a quality of service (QoS) class identifier (QCI) 1 bearer, or a fifth generation (5G) QoS identifier (5QI) 1 bearer); based at least on an error condition (e.g., a timeout or error message), instructing, by the proxy node, the UE to set up the voice session using an existing non-GBR data pipe (e.g., a default bearer, a QCI-5 bearer, or a 5QI-5 bearer).

In some examples, the voice session is a voice over long-term evolution (VoLTE) call in a fourth generation (4G) cellular network, a voice over new radio (VoNR) call in a 5G cellular network, another wireless voice call type (e.g., in a different cellular generation, or a video call (included within "voice call" herein). In some examples, the GBP data pipe is an internet protocol (IP) multimedia system (IMS) dedicated bearer, and the non-GBR data pipe is an IMS default bearer.

Aspects of the disclosure improve the reliability of cellular communications by permitting voice calls to occur over a non-GBR default bearer when the wireless network is unable to set up a GBR dedicated bearer (e.g., based at least on an error condition, instructing, by the proxy node, the UE to set up the voice session using an existing non-GBR data pipe). This operation provides advantages that improve user experience. Whereas, previously, the voice call would not go through (i.e., the call would fail) or would drop during handover, aspects of the disclosure enable a voice call to go through or survive a handover, although with a channel condition (i.e., no GBR) that theoretically may result in lower call quality. In experiments, however, the difference in call quality was generally unnoticeable by users.

Figure 1:
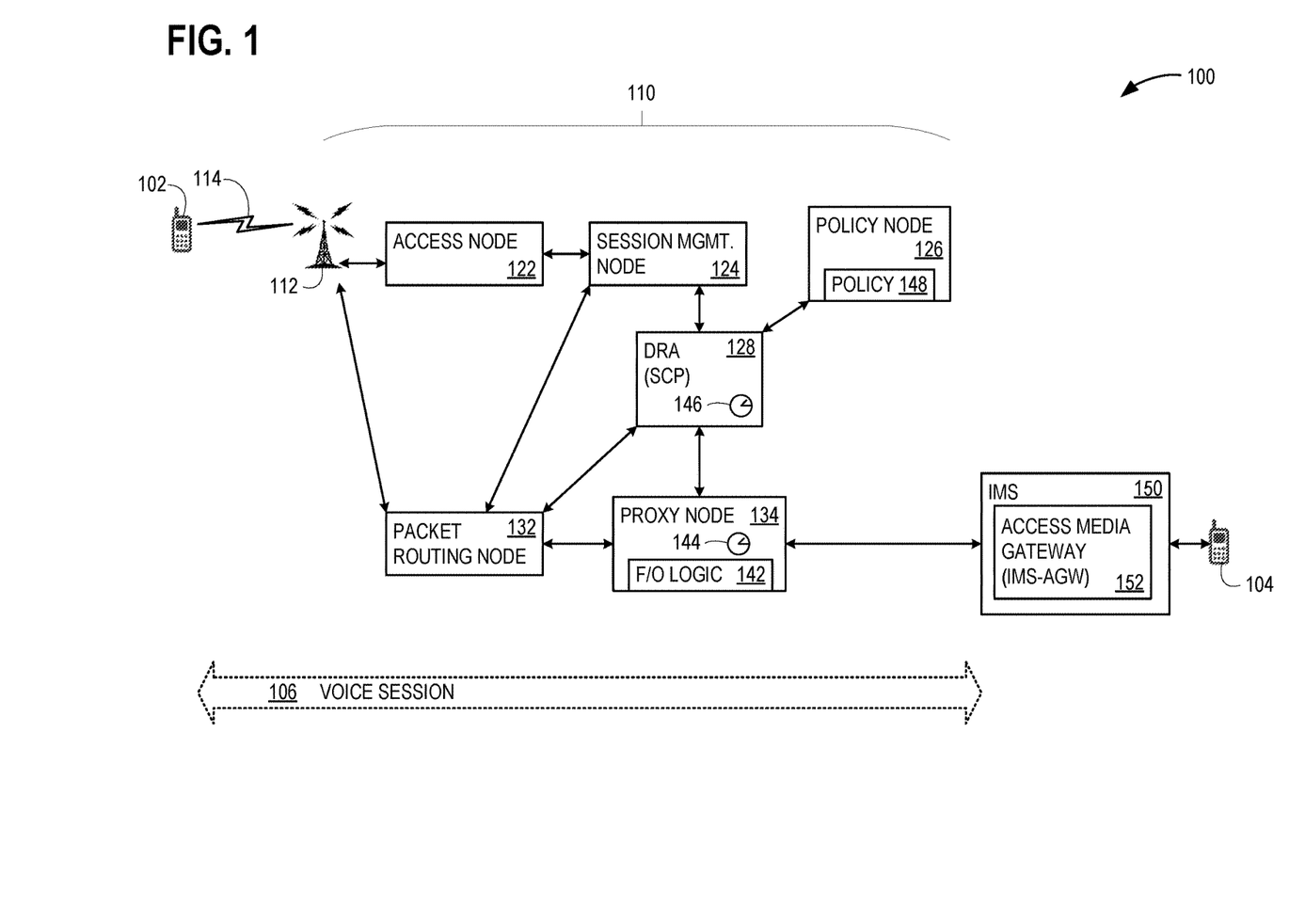
FIG. 1 illustrates an exemplary arrangement that advantageously provides best effort service for voice calls (including video calls) using a non-guaranteed bit rate (GBR) bearer.

With reference now to the figures, FIG. 1 illustrates an arrangement 100 that advantageously provides best effort service for voice calls (including video calls) using a non-GBR bearer. Arrangement 100 permits a UE 102 to transmit voice data packets and video call data packets for a voice session 106 in a call with a UE 104 using non-GBR data pipe 204 (e.g., a default bearer used as a signaling data pipe, see FIG. 2) when a requested GBR data pipe 206 (a dedicated bearer, which is typically used as a voice data pipe) cannot be set up in time to prevent abandonment or dropping of the call. In some examples, voice data packets and video call data packets use real-time transport protocol (RTP), meaning that RTP packets will be sent over non-GBR data pipe 204 if GBR data pipe 206 cannot be set up in time.

UE 102 communicates with a serving base station 112 of a (cellular) wireless network 110 over an air interface 114. Wireless network 110 includes an access node 122, a session management node 124, a policy node 126, a diameter routing agent (DRA) 128, a packet routing node 132, and a proxy node 134. DRA 128 may be a DRA in 4G, although in 5G, DRA 128 may instead be a Service Communication Proxy (SCP) or be eliminated and replaced with a direct interface between packet routing node 132 and proxy node 134. In some examples, proxy node 134 comprises a P-CSCF.

For 4G, access node 122 may comprise a mobility management entity (MME), session management node 124 may comprise a packet data network gateway (PGW) control plane function (PGW-C) and a serving gateway (SGW) control plane function (SGW-C), policy node 126 may comprise a policy and charging rules function (PCRF), and packet routing node 132 may comprise a PGW user plane function (PGW-U) and an SGW user plane function (SGW-U). For 5G, access node 122 may comprise an access and mobility management function (AMF), session management node 124 may comprise a session management function (SMF), policy node 126 may comprise a policy control function (PCF), DRA 128 may be an SCP, and packet routing node 132 may comprise a user plane function (UPF).

A cellular wireless network may employ multiple policy nodes (e.g., PCFs or PCRFs) that are grouped into destination realms (also known as diameter realms), each of which may include multiple policy nodes and a DRA/SCP. A DRA (e.g., DRA 128) provides real-time routing capabilities to ensure that network messages are routed to the correct destinations. An SCP may employ a service based interface such as the N5 interface or a network application function (Naf) in a service based architecture (SBA).

For voice and video calls, the route for the data packets passes from UE 104 over air interface 114, through base station 112, packet routing node 132, proxy node 134, and an IMS 150, which includes an IMS access gateway (IMS-AGW 152) to UE 104. Signaling to set up voice session 106 passes from UE 104 over air interface 114, through base station 112, and access node 122, to session management node 124. Session management node 124 is communicatively coupled to packet routing node 132 and proxy node 134, permitting session management node 124 to instruct packet routing node 132 and proxy node 134 to assign and release resources for voice session 106.

Figure 2:
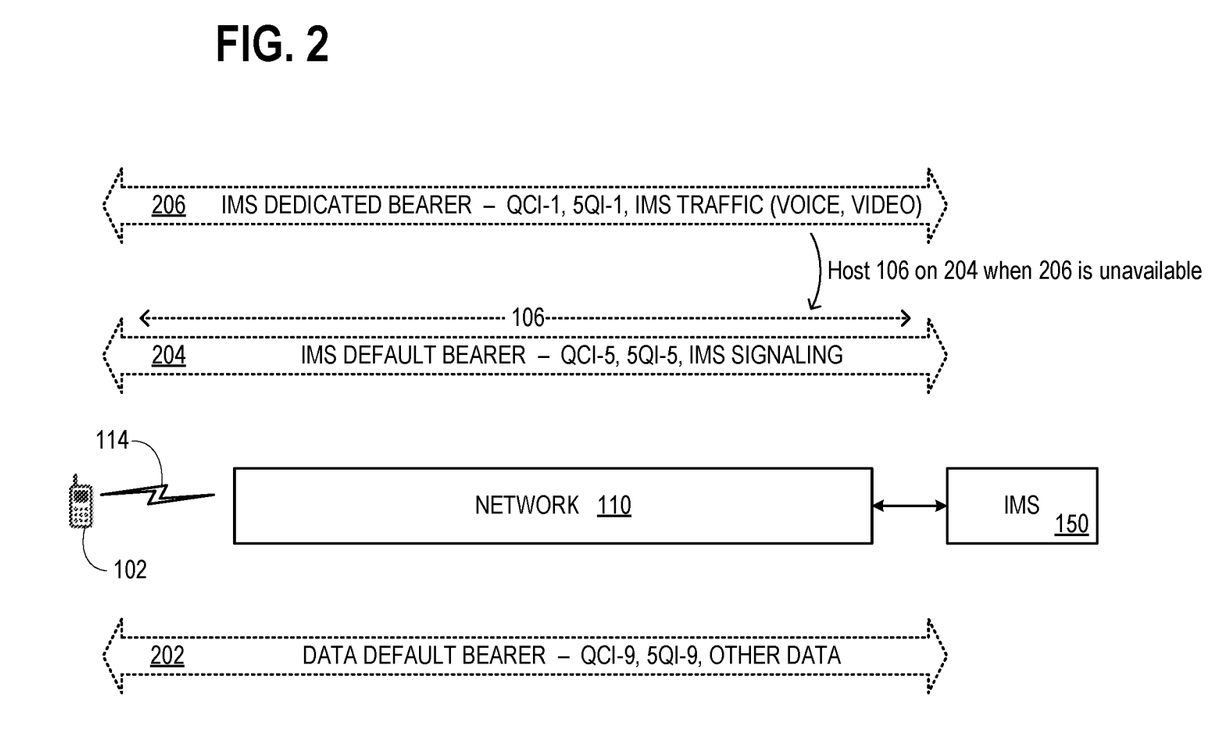
FIG. 2 illustrates exemplary data pipes used in the arrangement of FIG. 1.

Turning briefly to FIG. 2, exemplary data pipes 202, 204, and 206, used in arrangement 100, are shown. When UE 102 connects to wireless network 110, general data pipe 202 is set up as a data default bearer, as a QCI-9 bearer in 4G or a 5QI-9 bearer in 5G. General data pipe 202 is used for generic data (e.g., streaming video) and is a non-guaranteed bit rate (non-GBR) bearer with an allowance for a 100 millisecond (ms) packet delay and a 1/1,000,000 packet loss rate. Also, after UE 102 connects to wireless network 110, a signaling data pipe, shown as non-GBR data pipe 204 is set up as an IMS default bearer (e.g., as a QCI-5 bearer in 4G or a 5QI-5 bearer in 5G). Non-GBR data pipe 204 is used for IMS signaling, such as session initiation protocol (SIP) signaling that is used for setting up voice session 106, with an allowance for a 100 ms packet delay and a 1/1,000,000 packet loss rate. However, whereas packets in generic data pipe 202 have a priority of 9, packets in non-GBR data pipe 204 have a priority of 1 (highest priority). Typically, default bearers (e.g., general data pipe 202 and non-GBR data pipe 204) remain active while UE 102 remains attached to wireless network 110, and each has its own IP address.

In typical voice call scenarios, when UE 102 sends SIP signaling to wireless network 110, a voice call data pipe (e.g., GBR data pipe 206) is set up to transmit voice packets of voice session 106, and released when voice session 106 ends (or is replaced by another GBR data pipe 206 during a handover). GBR data pipe 206 is set up as an IMS dedicated bearer, as a QCI-1 bearer in 4G or a 5QI-1 bearer in 5G for voice only. GBR data pipe 206 has an allowance for a 100 ms packet delay and a 1/100 packet loss rate with a priority of 2 (second highest priority). A dedicated bearer is linked to a default bearer to provide a dedicated tunnel for specific traffic (e.g., voice traffic) and shares the same IP address. For video calls, two IMS dedicated bearers are used, one for the voice data and one for the video data. Thus for video calls, GBR data pipe 206 represents both a QCI-1 bearer in 4G or a 5QI-1 bearer for the voice and also a QCI-2 bearer in 4G or a 5QI-2 bearer in 5G for the video.

Returning to FIG. 1, when UE 102 sends a request to initiate voice session 106 to wireless network 110 (e.g., to session management node 124), it is expected that setup of GBR data pipe 206 may take time or may require multiple attempts. Thus, proxy node 134 has a timer 144 that allows for a timeout period prior to determining that an error condition exists and GBR data pipe 206 will not be set up in time.

When proxy node 134 receives the request from UE 102, it can wait until a SIP 183 response arrives for the session to be initiated, as proxy node 134 is able to set up a dedicated bearer over the initial request or at the response to the request (over SIP). Proxy node 134 also has a fail-over logic 142 that determines when to abandon setting up GBR data pipe 206 and instead instruct UE 102 to use non-GBR data pipe 204 for voice session 106. In some examples, policy node 126 also has a policy 148 that permits using non-GBR data pipe 204 for voice session 106. The set up and exchange of information for IMS 150 takes place over the IMS default bearer (e.g., non-GBR data pipe 204).

Different triggers exist for fail-over logic 142 to determine that an error condition exists. One trigger may be a timeout with timer 144, prior to receiving a message that GBR data pipe 206 has been successfully set up. Another trigger is receiving an error message, for example from DRA 128, indicating that GBR data pipe 206 will not be set up. In some examples, DRA 128 has its own timer 146. If, while routing messages among the various nodes of wireless network 110, DRA 128 does not receive a response indicating that GBR data pipe 206 has been or will be successfully set up, prior to a timeout with timer 146, DRA 128 may send an error code to proxy node 134. There may be multiple different failures in wireless network that prevent GBR data pipe 206 from being successfully set up within the allotted time. These include a failure at DRA 128, a failure at policy node 126, or a failure of policy node 126 to establish resources (e.g., with packet routing node 132) for setting up GBR data pipe 206.

Figure 3:
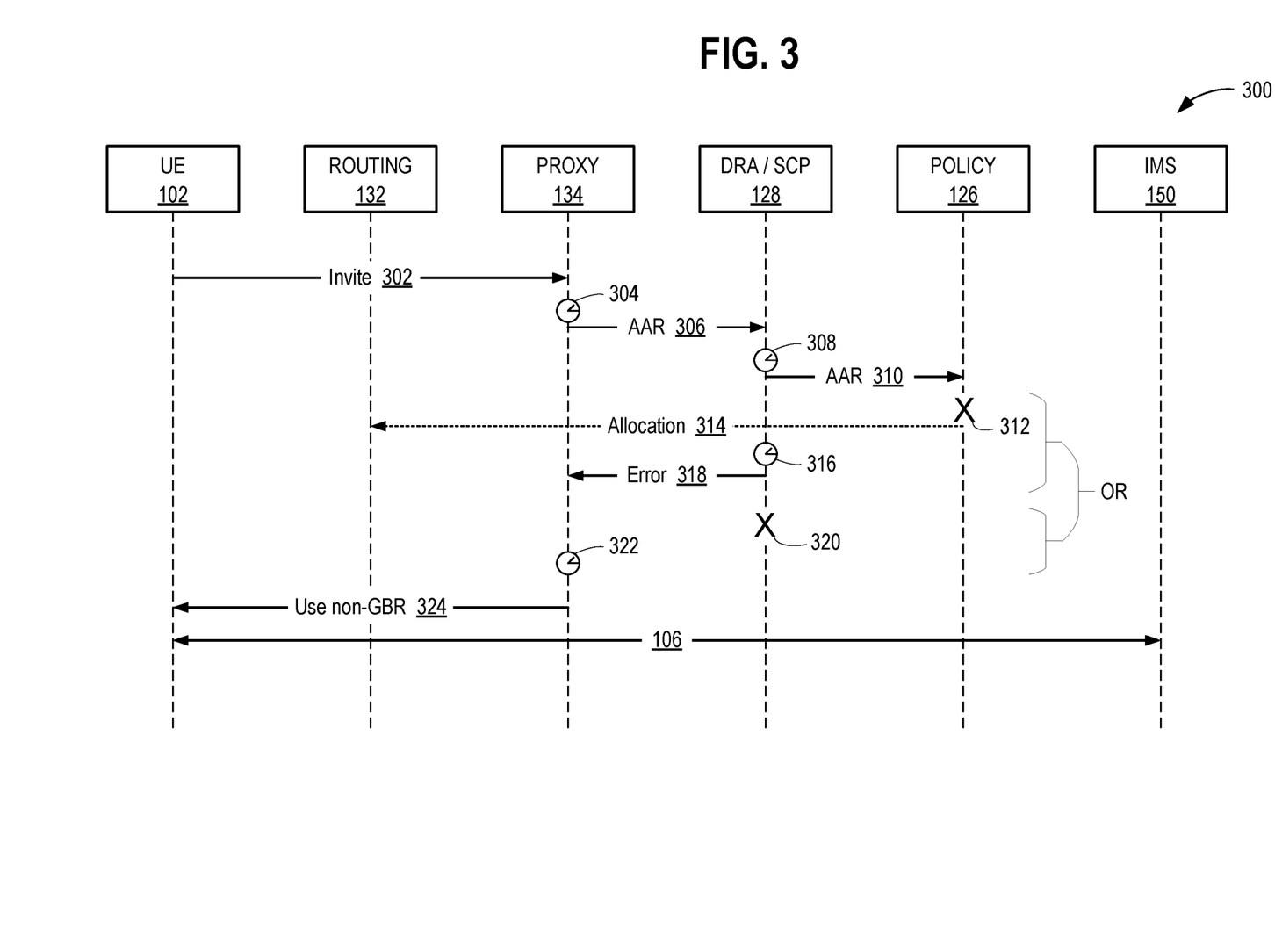
FIG. 3 illustrates a message sequence diagram showing exemplary messages that may be used in the arrangement of FIG. 1.

FIG. 3 illustrates a message sequence diagram 300 showing exemplary messages that may be used in arrangement 100. UE 104 transmits a SIP invite 302 over non-GBR data pipe 204 (which is used for signaling), which is received by proxy node 134. UE 102 does not request dedicated bearer setup, however, proxy node 134 identifies that the request for a voice session (or video call session) triggers the setup of a dedicated bearer. UE 102 waits for the setup. Proxy node 134 starts its timer 144 at timer mark 304, and transmits a message 306 to DRA 128 that contains the subscriber ID for UE 102, an application function (AF) identification (ID), an IMS application layer charging ID, and media information (including the media type and media stream description). In some examples, message 306 is an AAR message to a DRA over an Rx interface. In some examples, message 306 is an Npcf_Policy_Authorization-_Create_Request for SCP over an N5 interface. DRA 128 (which may be an SCP in 5G) forwards this to policy node 126 as message 310 and starts its own timer 146 at timer mark 308. In some examples, message 310 is an AAR message or an Npcf_Policy_Authorization message.

Two different error condition scenarios are shown. In the first illustrated scenario, there is a network event 312 that prevents policy node 126 from allocating resources with packet routing node 132 (which would have used message 314) to set up GBR data pipe 206. As a result, there is a timeout 316 (e.g., a timer lapse of timer 146), and DRA 128 transmits an error message 318 to proxy node 134. In the second illustrated scenario, there is a network event 320 that prevents DRA 128 from routing messages necessary to set up GBR data pipe 206 (e.g., AAR message 310 or a confirmation that resources have been allocated by packet routing node 132). As a result, there is a timeout 322 (e.g., a timer lapse of timer 144). Other failure/error scenarios also exist.

In either of the illustrated scenarios (or another failure/error scenario), fail-over logic 142 to determine that an error condition exists and instructs UE 102 with a message 324 to use non-GBR data pipe 204 for voice session 106. Until this point, UE 102 had been waiting for the setup of GBR data pipe 206, so message 324 terminates the waiting period for UE 102. UE 102 then uses non-GBR data pipe 204 to send data packets for voice session 106 to IMS 150 (e.g., using RTP), which are then forwarded to UE 104.

Figure 4:
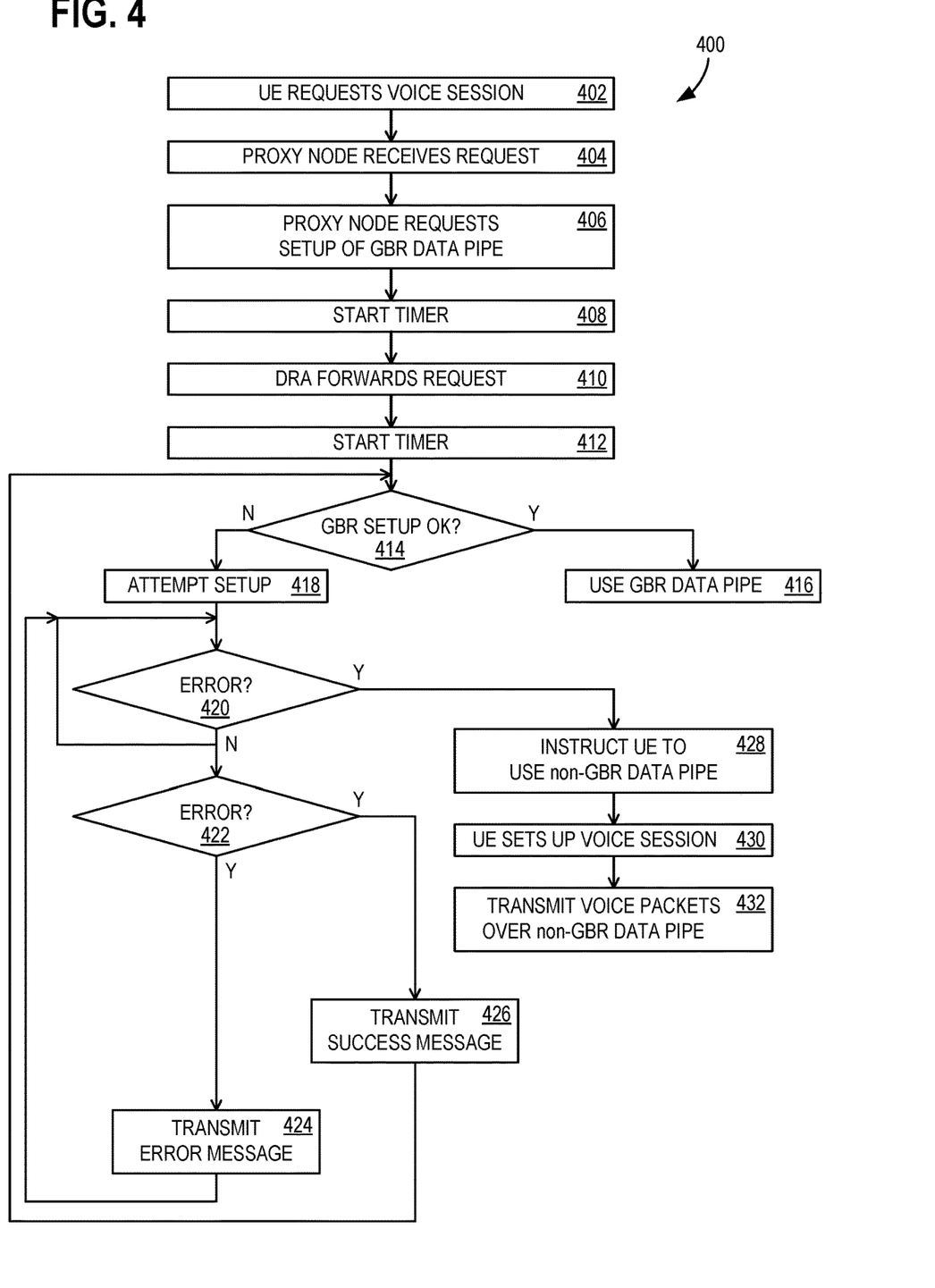
FIG. 4 illustrates a flowchart of exemplary operations associated with the arrangement of FIG. 1.

FIG. 4 illustrates a flowchart 400 of exemplary operations associated with providing a voice call for UE 102 using voice session 106 over wireless network 110. In some examples, at least a portion of flowchart 400 may be performed using one or more computing devices 600 of FIG. 6 (e.g., UE 102, packet routing node 132, proxy node 134, DRA 128, and policy node 126 may be examples of computing device 600). In some examples, the wireless network comprises a 4G cellular network. In some examples, the wireless network comprises a 5G cellular network. In some examples, the voice session is selected from the list consisting of: a VoLTE call, a VoNR call, another wireless voice call type, and a video call.

Flowchart 400 commences with UE 102 requesting voice session 106 (e.g., with SIP invite 302) in operation 402. Operation 404 includes receiving, at proxy node 134, the request to set up voice session 106 (for UE 102) with GBR data pipe 206. This request may be received over the IMS non-GBR default bearer (e.g., non-GBR data pipe 204), because voice signaling is routed on the default bearer (even if a dedicated bearer is later set up successfully).

In some examples, proxy node 134 comprises a P-CSCF. In some examples, operation 404 includes proxy node 134 receiving the request from UE 102, possibly via session management node 124. In some examples, the request to set up voice session 106 comprises a mobile origination (MO) message, such as when UE 102 initiates a call to UE 104. In some examples, the request to set up voice session 106 comprises a mobile termination (MT) message; such as when UE 102 receives a call from UE 104. In some examples, the request to set up voice session 106 comprises a request for a new call. In some examples, the request to set up voice session 106 comprises at least a portion of a handover message. In some examples, the request to set up voice session 106 comprises a SIP message.

Operation 406 includes requesting, by proxy node 134, policy node 126 to set up GBR data pipe 206 and then proxy node 134 starts timer 144 at operation 408. Operation 406 may include proxy node 134 requesting that policy node 126 allocate resources, and routing the request through DRA 128. In some examples, the policy node comprises a PCRF. In some examples, the policy node comprises a PCF. In some examples, GBR data pipe 206 comprises a dedicated bearer. In some examples, GBR data pipe 206 comprises an IMS dedicated bearer. In some examples, GBR data pipe 206 comprises a QCI-1 bearer (plus a QCI-2 bearer for the video data, for video calls). In some examples, GBR data pipe 206 comprises a 5QI-1 or 5QI-2 bearer.

DRA 128 receives and forwards the request (from proxy node 134 to policy node 126) in operation 410 (e.g. as AAR messages 306 and 310), and starts timer 146 at operation 412. Decision operation 414 determines whether GBR data pipe 206 may be set up (e.g., resources are available and allocated). If so, proxy node 134 instructs UE 102 to set up and use GBR data pipe 206 for voice session 106 in operation 416.

While proxy node 134 is awaiting a message that GBR data pipe 206 may be set up, flowchart 400 moves to operation 418, which includes attempting, by policy node 126, to establish a resource (or resources) for voice session 106. This may include, for example, attempting, by policy node 126, to establish a resource for voice session 106 with packet routing node 132 (e.g., with message 314). In some examples, packet routing node 132 comprises a PGW. In some examples, packet routing node 132 comprises a UPF.

Decision operation 420 determines whether an error condition exists that warrants using GBR data pipe 206 for voice session 106. In some examples, the error condition comprises a timeout prior to allocating a needed resource for GBR data pipe 206 (e.g., allocating resources on packet routing node 132). Decision operation 420 remains looping while timer 144 remains running, or until an error message is received by proxy node 134 (e.g., error message 318 from DRA 128). If proxy node 134 detects that timer 144 has lapsed (e.g., a timeout has occurred), this is one of the possible triggers for determining that an error condition has occurred and flowchart 400 moves to operation 428 (described below). Another trigger is an error message. In some examples, the error condition comprises an error condition selected from the list consisting of: a timeout (e.g., lapse of timer 144 or 146) prior to allocating a needed resource for GBR data pipe 206, an error message received by proxy node 134, or a detected network condition as described below.

Decision operation 422 is performed by another node in wireless network 110, for example by DRA 128. If resources for GBR data pipe 206 are not allocated prior to DRA 128 detecting a lapse of timer 146, or DRA 128 detects another error condition, DRA 128 transmits an error message (e.g., error message 318) to proxy node 134 in operation 424. In some examples, the error condition comprises a timeout of timer 146 at DRA 128. In some examples, the error condition comprises a network error rate exceeding an error threshold, such as a high bit error rate (BER), dropped packet rate, or dropped call rate. In some examples, the error condition comprises a network error performance metric failing to meet a performance threshold, such as throughput. Error conditions based on performance (e.g., a detected network condition) may be detected at other nodes within wireless network 110, such as session management node 124, or even proxy node 134 itself.

If DRA 128 detects an error condition and transmits an error message to proxy node 134, operation 424 also includes receiving, by proxy node 134, the error message. Otherwise, operation 426 includes transmitting, by DRA 128, a success message to proxy node 134. In the event of successful allocation of resources for GBR data pipe 206, flowchart 400 returns to decision operation 414 and then moves to operation 416, described above.

Returning to the error condition scenario of decision operation 422. After operation 424 transmits the error message, flowchart 400 returns to decision operation 420, which directs flowchart 400 into operation 428. Operation 428 includes, based at least on an error condition, instructing, by proxy node 134, UE 102 to set up voice session 106 using (existing) non-GBR data pipe 204. In some examples, the non-GBR data pipe 204 comprises a default bearer. In some examples, the non-GBR data pipe 204 comprises an IMS default bearer. In some examples, the non-GBR data pipe 204 comprises a QCI-5 bearer. In some examples, the non-GBR data pipe 204 comprises a 5QI-5 bearer.

Operation 430 includes (based at least on the instruction from proxy node 134) setting up, by UE 102, voice session 106 using the non-GBR data pipe 204. Operation 432 includes UE 102 transmitting voice packets for voice session 106 over non-GBR data pipe 204.

Figure 5:
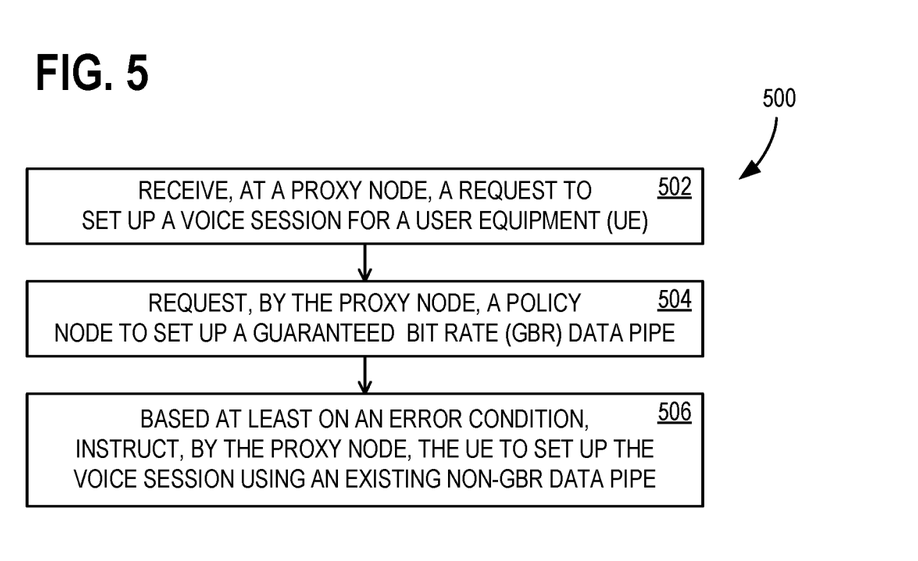
FIG. 5 illustrates another flowchart of exemplary operations associated with the arrangement of FIG. 1.

FIG. 5 illustrates a flowchart 500 of exemplary operations associated with examples of arrangement 100. In some examples, at least a portion of flowchart 500 may be performed using one or more computing devices 600 of FIG. 6. Flowchart 500 commences with operation 502, which includes receiving, at a proxy node, a request to set up a voice session for a UE. Operation 504 includes requesting, by the proxy node, a policy node to set up a GBR data pipe. Operation 506 includes, based at least on an error condition, instructing, by the proxy node, the UE to continue setting up the voice session using an existing non-GBR data pipe.

Figure 6:
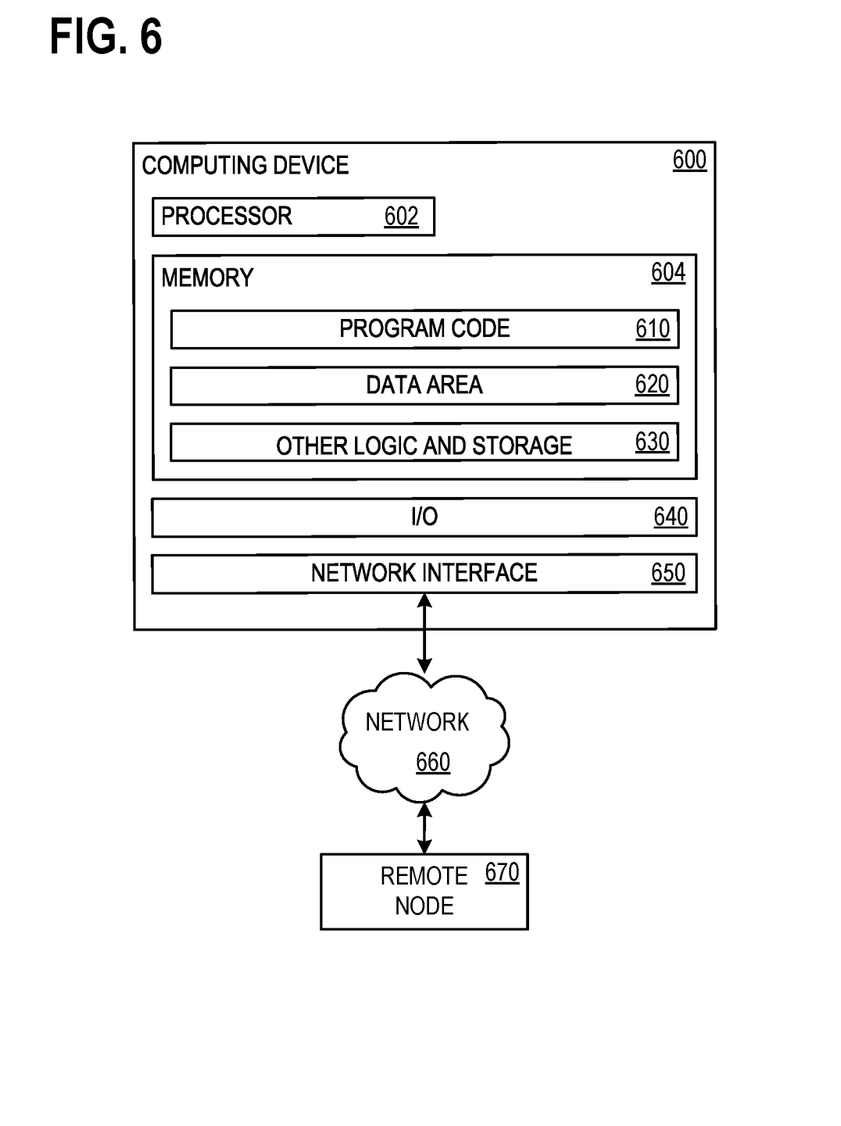
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600. For example, a remote node 670 may represent another of the above-noted nodes within arrangement 100.

ADDITIONAL EXAMPLES

An example method of providing a voice session over a wireless network comprises: receiving, at a proxy node, a request to set up a voice session for a UE; requesting, by the proxy node, a policy node to set up a GBR data pipe; based at least on an error condition, instructing, by the proxy node, the UE to set up the voice session using an existing non-GBR data pipe.

An example system for providing a voice session over a wireless network, the system comprises: a processor; and a computer-readable medium storing instructions that are operative upon execution by the processor to: receive, at a proxy node, a request to set up a voice session for a UE; request, by the proxy node, a policy node to set up a GBR data pipe; based at least on an error condition, instruct, by the proxy node, the UE to set up the voice session using an existing non-GBR data pipe.

One or more example computer storage devices has computer-executable instructions stored thereon, which, upon execution by a computer, cause the computer to perform operations comprising: receiving, at a proxy node, a request to set up a voice session for a UE; requesting, by the proxy node, a policy node to set up a GBR data pipe; based at least on an error condition, instructing, by the proxy node, the UE to set up the voice session using an existing non-GBR data pipe.

Alternatively, or in addition to the other examples described herein, examples include any combination of the following:

- the voice session is selected from the list consisting of: a VoLTE call, a VoNR call, another wireless voice call type, and a video call;
- the wireless network comprises a 4G cellular network;
- the wireless network comprises a 5G cellular network;
- receiving, from the UE, the request to set up the voice session;
- the proxy node comprises a P-CSCF;
- the request to set up the voice session comprises an MO message;
- the request to set up the voice session comprises an MT message;
- the request to set up the voice session comprises a request for a new call;
- the request to set up the voice session comprises at least a portion of a handover message;
- the request to set up the voice session comprises a SIP message
- the policy node comprises a PCRF;
- the policy node comprises a PCF;
- the GBR data pipe comprises a dedicated bearer;
- the GBR data pipe comprises an IMS dedicated bearer;
- the GBR data pipe comprises a QCI-1 bearer;
- the GBR data pipe comprises a QCI-2 bearer;
- the GBR data pipe comprises a 5QI-1 bearer;
- the GBR data pipe comprises a 5QI-2 bearer;
- attempting, by the policy node, to establish a resource for the voice session;
- attempting, by the policy node, to establish a resource for the voice session with a packet routing node;
- the packet routing node comprises a PGW;
- the packet routing node comprises a UPF;
- detecting a lapse of a timer by the proxy node;
- detecting a lapse of a timer by the DRA;
- transmitting, by the DRA, an error message to the proxy node;
- receiving, by the proxy node, the error message;
- the non-GBR data pipe comprises a default bearer;
- the non-GBR data pipe comprises an IMS default bearer;
- the non-GBR data pipe comprises a QCI-5 bearer;
- the error condition comprises a timeout prior to allocating a resource for the GBR data pipe;
- the error condition comprises a timeout of a timer at the proxy node;
- the error condition comprises a timeout of a timer at the DRA;

the error condition comprises an error message received by the proxy node;
the error condition comprises a network error rate exceeding an error threshold;
the error condition comprises a network error performance metric failing to meet a performance threshold;
setting up the voice session using the non-GBR data pipe; and
based at least on the instruction from the proxy node, setting up the voice session using the non-GBR data pipe.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a voice session over a wireless network, the method comprising:
    receiving, at a proxy-call session control function (P-CSCF) node, a request to set up a voice session for a user equipment (UE);
    transmitting, by the P-CSCF node to a diameter routing agent (DRA) or Service Communication Proxy (SCP), a request to set up a fifth generation (5G) quality of service (QoS) identifier 1 (5QI-1) or 5G QoS identifier 2 (5QI-2) bearer for the voice session of the UE, the request including an identifier (ID) assigned to the UE, wherein the 5QI-1 or 5QI-2 bearer is a guaranteed bit rate (GBR) data pipe of a 5G network, and wherein the P-CSCF node starts a timer upon transmitting the request;
    receiving, by the P-CSCF node, an indication of an error condition from the DRA or SCP prior to timeout of the timer, wherein the error condition corresponds to a network error rate exceeding an error threshold or a network performance metric failing to meet a performance threshold; and
    based at least on the error condition, sending, by the P-CSCF node, an instruction to the UE that instructs the UE to use an existing 5G QoS identifier 5 (5QI-5) bearer for the voice session of the UE, wherein the existing 5QI-5 bearer is a non-GBR data pipe of the 5G network.

2. The method of claim 1, wherein the 5QI-1 or 5QI-2 bearer comprises a dedicated bearer, and wherein the existing 5QI-5 bearer comprises a default bearer.

3. The method of claim 1, wherein the DRA or SCP forwards the request to a policy and charging rules function (PCRF).

4. The method of claim 1, wherein the DRA or SCP forwards the request to a policy control function (PCF).

5. The method of claim 1, wherein the voice session is a voice over long-term evolution (VoLTE) call.

6. The method of claim 1, wherein the voice session is a voice over new radio (VoNR) call.

7. The method of claim 1, wherein the voice session is a video call.

8. A system for providing a voice session over a wireless network, the system comprising:
    a processor; and
    a computer-readable medium storing instructions that are operative upon execution by the processor to:
        receive, at a proxy-call session control function (P-CSCF) node, a request to set up a voice session for a user equipment (UE);
        transmit, by the P-CSCF node to a diameter routing agent (DRA) or Service Communication Proxy (SCP), a request to set up a fifth generation (5G) quality of service (QoS) identifier 1 (5QI-1) or 5G QoS identifier 2 (5QI-2) bearer for the voice session of the UE, the request including an identifier (ID) assigned to the UE, wherein the 5QI-1 or 5QI-2 bearer is a guaranteed bit rate (GBR) data pipe of a 5G network, and wherein the P-CSCF node starts a timer upon transmitting the request;
        receive, by the P-CSCF node, an indication of an error condition from the DRA or SCP prior to timeout of the timer, wherein the error condition corresponds to a network error rate exceeding an error threshold or a network performance metric failing to meet a performance threshold; and
        based at least on the error condition, send, by the P-CSCF node, an instruction to the UE that instructs the UE to use an existing 5G QoS identifier 5 (5QI-5) bearer for the voice session of the UE, wherein the existing 5QI-5 bearer is a non-GBR data pipe of the 5G network.

9. The system of claim 8, wherein the 5QI-1 or 5QI-2 bearer comprises a dedicated bearer, and wherein the existing 5QI-5 bearer comprises a default bearer.

10. The system of claim 8, wherein the DRA or SCP forwards the request to a policy and charging rules function (PCRF).

11. The system of claim 8, wherein the DRA or SCP forwards the request to a policy control function (PCF).

12. The system of claim 8 wherein the voice session is a voice over long-term evolution (VoLTE) call or a voice over new radio (VoNR) call.

13. The system of claim 8, wherein the voice session is a video call.

14. One or more computer storage devices having computer-executable instructions stored thereon, which, upon execution by a computer, cause the computer to perform operations comprising:
    receiving, at a proxy-call session control function (P-CSCF) node, a request to set up a voice session for a user equipment (UE);
    transmitting, by the P-CSCF node to a diameter routing agent (DRA) or Service Communication Proxy (SCP), a request to set up a fifth generation (5G) quality of service (QoS) identifier 1 (5QI-1) or 5G QoS identifier 2 (5QI-2) bearer for the voice session of the UE, the request including an identifier (ID) assigned to the UE, wherein the 5QI-1 or 5QI-2 bearer is a guaranteed bit rate (GBR) data pipe of a 5G network, and wherein the P-CSCF node starts a timer upon transmitting the request;

receiving, by the P-CSCF node, an indication of an error condition from the DRA or SCP prior to timeout of the timer, wherein the error condition corresponds to a network error rate exceeding an error threshold or a network performance metric failing to meet a performance threshold; and based at least on the error condition, sending, by the P-CSCF node, an instruction to the UE that instructs the UE to use an existing 5G QoS identifier 5 (5QI-5) bearer for the voice session of the UE, wherein the existing 5QI-5 bearer is a non-GBR data pipe of the 5G network.

15. The one or more computer storage devices of claim 14, wherein the 5QI-1 or 5QI-2 bearer comprises a dedicated bearer, and wherein the existing 5QI-5 bearer comprises a default bearer.

16. The one or more computer storage devices of claim 14, wherein the DRA or SCP forwards the request to a policy and charging rules function (PCRF).

17. The one or more computer storage devices of claim 14, wherein the DRA or SCP forwards the request to a policy control function (PCF).

18. The one or more computer storage devices of claim 14, wherein the voice session is a voice over long-term evolution (VoLTE) call.

19. The one or more computer storage devices of claim 14, wherein the voice session is a voice over new radio (VoNR) call.

20. The one or more computer storage devices of claim 14, wherein the voice session is a video call.

\* \* \* \* \*